(12) United States Patent
Magnusson

(10) Patent No.: US 8,055,919 B2
(45) Date of Patent: Nov. 8, 2011

(54) PORT POWER CONTROLLER FOR USB HUBS WITH LEGACY BATTERY CHARGE SUPPORT

(75) Inventor: Hans L. Magnusson, Austin, TX (US)

(73) Assignee: Standard Microsystems Corporation, Hauppauge, NY (US)

( * ) Notice: Subject to any disclaimer, the term of this patent is extended or adjusted under 35 U.S.C. 154(b) by 447 days.

(21) Appl. No.: 12/367,009

(22) Filed: Feb. 6, 2009

(65) Prior Publication Data

US 2010/0205463 A1    Aug. 12, 2010

(51) Int. Cl.
*G06F 1/26* (2006.01)
(52) U.S. Cl. .............. 713/300; 455/573; 710/8
(58) Field of Classification Search .............. 455/573; 710/8, 10; 713/300
See application file for complete search history.

(56) References Cited

U.S. PATENT DOCUMENTS

| | | | |
|---|---|---|---|
| 6,363,491 B1 | 3/2002 | Endo | |
| 6,493,770 B1 * | 12/2002 | Sartore et al. | 710/8 |
| 6,541,879 B1 | 4/2003 | Wright | |
| 6,669,513 B2 | 12/2003 | Huang | |
| 6,904,373 B2 | 6/2005 | Le et al. | |
| 7,093,031 B2 * | 8/2006 | Ray et al. | 710/1 |
| 2007/0035276 A1 * | 2/2007 | Webjorn | 320/114 |
| 2007/0058332 A1 | 3/2007 | Canterbury et al. | |

\* cited by examiner

*Primary Examiner* — Albert Wang
(74) *Attorney, Agent, or Firm* — Meyertons Hood Kivlin Kowert & Goetzel, P.C.; Rory D. Rankin

(57) ABSTRACT

A system and method for efficient power management of peripheral port connections. A USB hub core is configured to detect the presence of a legacy peripheral device on a downstream port when a corresponding USB host is in a non-operational state. The USB hub core chooses a battery charger signature for the peripheral device and subsequently directs an external port power controller to simulate disconnection/reconnection of the peripheral device. The chosen signature is presented to the peripheral device. If the signature matches the expected value of the peripheral device, then the peripheral device charges its battery. Otherwise, the process of choosing a different signature and simulating disconnection/reconnection is repeated.

20 Claims, 5 Drawing Sheets

PORT POWER CONTROLLER FOR USB HUBS WITH LEGACY BATTERY CHARGE SUPPORT

BACKGROUND OF THE INVENTION

1. Field of the Invention

This invention relates to electronic circuits, and more particularly, to efficient power management of peripheral port connections.

2. Description of the Relevant Art

A Universal Serial Bus (USB) is a standard serial bus interface for connecting devices, such as multiple computer peripherals or portable music and video players, to a host computer for easy transfer of data by means of hot swapping, or allowing devices to be connected and disconnected without a need to reboot the computer or to turn off the device. This means of connecting is also referred to as hot plugging. USB allows several devices to be used without requiring manufacturer-specific device drivers to be installed on the host computer. USB may also be utilized as a bridging power cord between a peripheral device and an AC adapter plugged into a wall plug for battery charging purposes. The USB Implementers Forum (USB-IF), an industry trade association incorporating companies from the computer and electronics industries, standardizes the design of USB. USB is intended to replace many legacy varieties of serial and parallel ports, and for many computer peripherals, USB has become the standard connection protocol.

USB interface is a master/slave architecture. The master is referred to as the "upstream" device or host/hub and the slave as the "downstream" device. The interface consists of four wires: D+, D−, VBUS, and Ground. The two data lines, D+ and D−, are for bi-directional data transfer and use differential drive techniques. The wires VBUS and Ground are used to distribute power from the upstream host to the downstream device.

USB devices are linked in series through hubs. A USB hub is a device that allows many USB devices to be connected to a single USB port on the host computer or another hub. USB hubs may be built into equipment, such as keyboards or monitors. Each hub has one upstream port and a number of downstream ports. The upstream port connects the hub (directly or through other hubs) to the host. Other hubs or devices may be attached to the downstream ports.

There are two types of hubs. First, a bus-powered hub is a hub that draws all its power from the host computer's USB interface. It does not need a separate power connection. A bus-powered hub is able to provide power to low-consumption devices without the need for an external power supply. However, many devices, or peripherals, require more power than this type of hub can provide, and therefore, these devices will not work with this type of hub. A second type, a self-powered hub, is a hub that draws its power from an external power supply unit. Therefore, a self-powered hub is able to provide full power to every port.

A USB is host controlled. There can only be one host per bus. The USB 2.0 Specification does not support any form of multi-master arrangement. The USB host is responsible for undertaking all transactions and scheduling bandwidth. Data may be sent by various transaction methods using a token-based protocol. Typically, a USB host controller is built into modern computers, while older computers can be updated with the hardware. For example, a hi-speed USB host controller may reside on a card that installs into any available slot on the motherboard. The back-facing plate of the controller provides two or more USB ports.

Both the USB host ports and the downstream USB hub ports require port power management. Port power management is defined in the USB 2.0 Specification, which is supported by the USB-IF, to include a power switch and over-current protection with reporting. An external Port Power Controller, available from multiple manufacturers, provides single or dual USB port support when used with a USB hub. However, backwards compatibility with legacy battery charging devices is problematic in that there is no standard method. Various manufacturers have devised several different methods. In addition, some methods interfere with normal USB operation. Further, more advanced power management functions are forthcoming in the USB Battery Charging Specification revision 2.0. A new capability is required for more advanced general port power management in the computing system.

In view of the above, efficient methods and systems for efficient power management of peripheral port connections is desired.

SUMMARY OF THE INVENTION

Systems and methods for efficient power management of peripheral port connections are contemplated.

In one embodiment, a Universal Serial Bus (USB) hub core is coupled to an external port power controller. The USB hub core is configured to detect the presence of a legacy peripheral device on a downstream port when a corresponding USB host is in a non-operational state. In one embodiment, the detection is performed when the peripheral device pulls up a data line, such as D+ or D−. Resistors within the USB hub core as according to a USB Implementers Forum (IF) requirement may weakly pull down the data lines D+ and D−. The peripheral device may include circuitry that is configured to overcome the core's weak pull-down and pull up either data line D+ or D−. The USB hub core is configured to recognize a non-USB logic high value. The USB hub core chooses a legacy battery charger signature for the peripheral device and subsequently directs the port power controller to first turn off power on a corresponding VBUS line and then turn on power on this line. This action simulates a disconnection and a reconnection from the point-of-view of the peripheral device.

The chosen signature is conveyed on the data lines and received by the peripheral device. If the chosen signature matches the peripheral device, then the peripheral device enters a battery charging state and draws sufficient current from the VBUS line. However, if the chosen signature does not match the peripheral device, the process of choosing a different signature and turning off/on the VBUS line is repeated.

Also contemplated is a method to determine a battery charger signature match with a legacy peripheral device. When a legacy peripheral device is connected to a USB port, the peripheral device won't enter a battery charging state unless it receives a corresponding signature value. Each manufacturer assigns a battery charger signature for a battery charger of its own to be recognized by a corresponding peripheral device of its own. A different battery charger of a different manufacturer won't be able to charge the peripheral device. When a USB host is in a non-operational state, and, therefore, cannot begin a default battery charging protocol, the USB hub may begin the battery charging process. The method simulates a disconnection and reconnection of the peripheral device, and shortly afterwards, presents a legacy signature value to the peripheral device. If the signature matches the expected value of the peripheral device, then the peripheral device enters a battery charging state and charges its battery. However, if the chosen signature does not match the peripheral device, then the process of choosing a different signature and simulating disconnection/reconnection is repeated.

These and other embodiments will be appreciated upon reference to the following description and accompanying figures.

Figure 1:
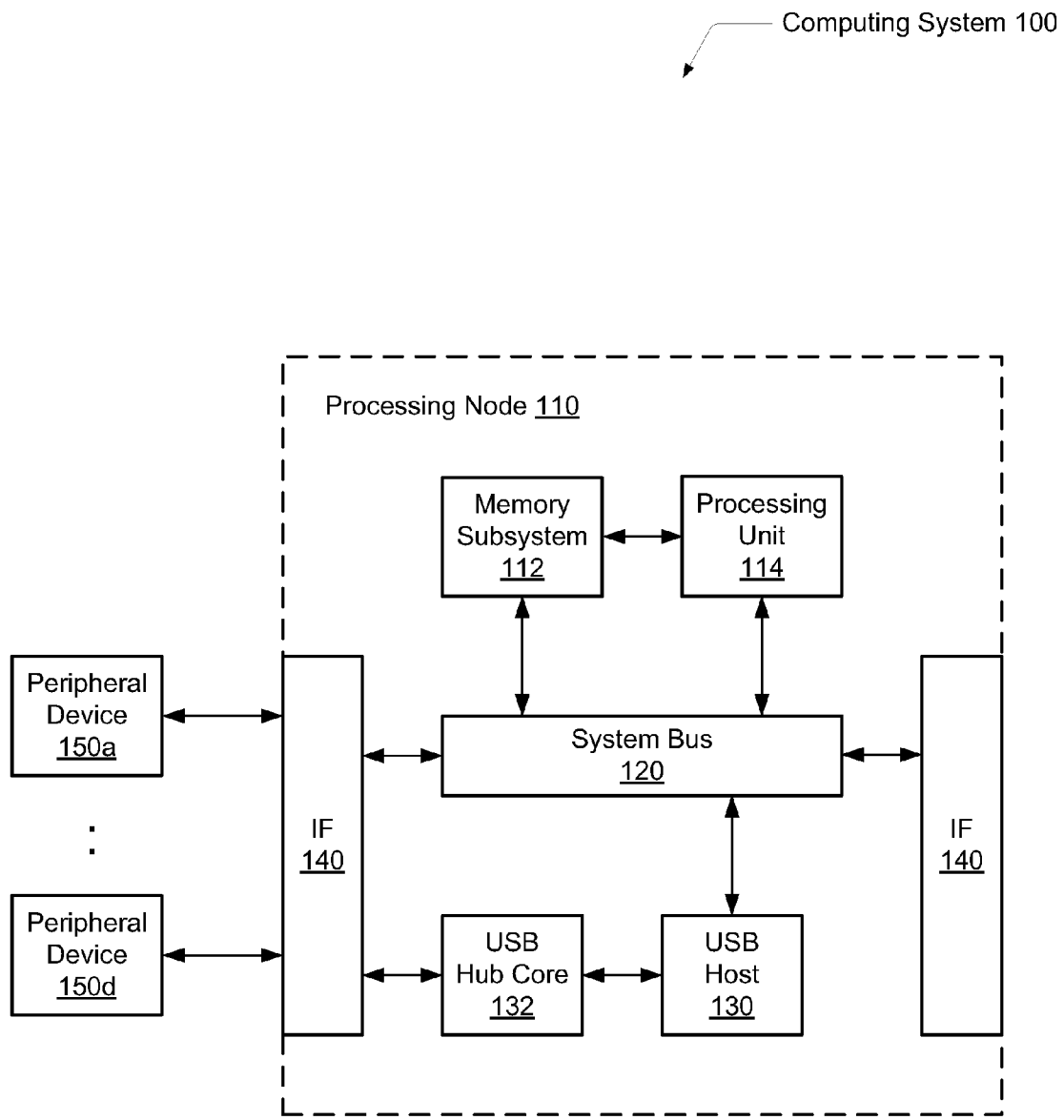
FIG. 1 is a generalized block diagram illustrating one embodiment of a computing system utilizing multiple peripheral devices.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

In the following description, numerous specific details are set forth to provide a thorough understanding of the present invention. However, one having ordinary skill in the art should recognize that the invention may be practiced without these specific details. In some instances, well-known circuits, structures, and techniques have not been shown in detail to avoid obscuring the present invention.

Referring to FIG. 1 one embodiment of a computing system 100 utilizing multiple peripheral devices is shown. This embodiment does not include all examples of functional blocks, control logic, and interfaces required both within and outside processing node 110. In addition, computing system 100 may comprise two or more processing nodes 110. The embodiment shown is for a simple illustrative purpose.

Computing system 100 includes at least one processing node 110, which may be a personal computer (PC), a server, a smartphone, a personal data assistant (PDA), a video game console, an automotive infotainment system comprising one or more of a navigation application with real-time traffic, a hands-free communication application, and an audio/video storage and playback application; or other. Processing node 110 may include system bus 120, processing unit 114, memory subsystem 112, interface logic 140, Universal Serial Bus (USB) host 130, and USB hub core 132. In one embodiment, the illustrated functionality of processing node 110 is incorporated upon a single integrated circuit.

In one embodiment, processing unit 114 includes one or more processor cores, wherein each processor core includes circuitry for executing instructions according to a predefined instruction set. For example, the x86 instruction set architecture (ISA) may be selected. Alternatively, the Alpha, PowerPC, or any other instruction set architecture may be selected. Each processor core may be implemented to simultaneously execute multiple software threads of a software application. In another embodiment, processing unit 114 includes one or more application specific integrated circuits (ASICs). In addition, processing unit 114 may include one or more digital signal processors (DSPs), graphic processing units (GPUs), analog-to-digital converters (ADCs), and digital-to-analog converters (DACs). Other data processing semiconductor chip designs included within processing unit 114 are possible and contemplated. Further, physically, these data processing designs may be implemented outside of processing unit 114 for interfacing reasons, on-die routing and signal integrity reasons, or other reasons.

Generally speaking, processing unit 114 accesses memory storage for data and instructions or commands. Although not shown, it is possible an ASIC, or other data processing die, may receive a command directly from an outside source via interface 140. In one embodiment, a cache memory subsystem implemented as a L1 cache structure configured to store blocks of data, and possibly with an additional L2 cache structure, is integrated within processing unit 114. Memory subsystem 112 is implemented as a L2 or L3 cache structure and may be directly coupled to processing unit 114. If a requested block is not found in an integrated cache structure or memory subsystem 112, then a read request may be generated and transmitted to a memory controller not shown in order to access outside memory to which the missing block is mapped. Outside memory, memory subsystem 112, and any integrated memory within processing unit 114 may comprise any suitable memory devices in addition to a cache structure. For example, these memories may comprise one or more RAMBUS dynamic random access memories (DRAMs), synchronous DRAMs (SDRAMs), DRAM, static RAM, sequential storage elements such as flip-flops and latches, etc.

System bus 120 is configured to respond to control packets received on the links to which processing node 110 is coupled, to generate control packets in response to processing unit 114 and/or memory subsystems 112, to generate probe commands and response packets in response to transactions selected by a memory controller not shown, and to route packets for which node 110 is an intermediate node to other nodes through interface logic 140. Interface logic 140 may include logic to receive packets and synchronize the packets to an internal clock used by system bus 120.

Processing node 110 is coupled to one or more peripheral devices 150a-150d. As used herein, elements referred to by a reference numeral followed by a letter may be collectively referred to by the numeral alone. For example, peripheral devices 150a-150d may be collectively referred to as peripheral devices 150. Depending on the implementation of processing node 110, peripheral devices 150 may include computer keyboards, computer mice, portable storage devices, external hard disk drives, scanners, joysticks, gamepads, printers, portable audio/video players, cameras, or other. A peripheral device 150 may consist of several logical subdevices that are referred to as device functions. A single peripheral device 150 may provide several functions. For example, a webcam has both a video device function and a built-in microphone, which is an audio device function. Other devices are contemplated to also be within the scope of the present invention. The specific type of peripheral used does not limit the invention.

Typically, serial data communications, such as a Universal Serial Bus (USB), is utilized as a standard interface for connecting peripheral devices 150 to processing node 110 for easy transfer of data by means of hot swapping. In one embodiment, a USB system has an asymmetric design, consisting of a USB host 130 comprising one or more USB host controllers, a USB hub core 132 comprising a multitude of downstream USB ports, and multiple peripheral devices 150 connected in a tiered-star topology. Additional USB hubs 132 may be included in the tiers, allowing branching into a tree structure with up to five tier levels. USB devices, such as peripheral devices 150 and USB hubs 132, are linked in series through USB hubs 132. One hub, known as a root hub, may be built into a host controller within USB host 130.

Typically, USB host 130 has a single host controller. However, there may be multiple host controllers within computing system 100. The host controller may provide one or more USB ports. In one embodiment, a maximum of 127 peripheral devices 150, including the hub devices 132, may be connected to a single host controller 130. USB host 130 connects a host system, such as processing node 110, to other network and storage devices, such as peripheral devices 150.

A host controller interface (HCI) is a register level interface, which allows a host controller within USB host 130 to communicate with the operating system of processing node 110. Three modern versions of HCI include an Open Host Controller Interface (OHCI), an Enhanced Host Controller Interface (EHCI), and a Universal Host Controller Interface (UHCI). Future specifications, such as USB 3.0, may have yet another host controller type. Again, although USB host 130 typically has one host controller, there may be multiple host controllers within computing system 100. For example, computing system 100 may include a chipset comprising one EHCI and three or more UHCI or OHCI host controllers. A root hub may select which host is associated with a USB port. On an expansion card or motherboard controller, the HCI may include digital logic engines in Field Programmable Gate Arrays (FPGAs) plus analog circuitry to manage the high-speed differential signals. On the software side, the HCI may require a device driver, or a Host Controller Driver (HCD). They are embedded in the USB host 130, which routes the differing USB speeds accordingly without user intervention.

USB hub core 132 may be included on-die or placed outside of processing node 110. In one embodiment, USB hub core 132 is a bus-power USB hub that receives 5V and 500 mA from an upstream VBUS signal through an upstream cable. A bus-powered USB hub core 132 supports a USB unit load of 5V and 100 mA for each downstream port, which allows for coupling to a peripheral device 150.

In another embodiment, USB hub core 132 is a self-power USB hub that receives 5V and 3.5 A through a normal power cable. A self-powered USB hub core 132 supports a USB unit load of 5V and 500 mA to each downstream port. Many modern USB hub cores are self-powered USB hub cores.

In one embodiment, the interfaces between USB hub core 132 and USB host 130 and interface 140 may include USB 2.0 Transceiver Macrocell Interface (UTMI) or an extended version (UTMI+). In another embodiment, the interfaces may include UTMI+ Low Pin Interface (ULPI), which is a 12-pin interface standard for connecting USB core logic to a USB transceiver. ULPI may be implemented as a wrapper around both UTMI+ and a physical layer (PHY) in order to reduce pin count in Hi-Speed (HS) USB systems.

Generally, interface logic 140 may comprise buffers for receiving packets from an outside link and for buffering packets to be transmitted upon the link. Computing system 100 may employ any suitable flow control mechanism for transmitting data. Interface logic 140 may include a physical layer (PHY), which may be integrated into most USB systems in order to provide a bridge between the digital and modulated parts of the interface. A PHY connects a link layer device to a physical medium such as an optical fibre or copper cable. A PHY typically includes a Physical Coding Sublayer (PCS) and a Physical Medium Dependent (PMD) sublayer. The PCS encodes and decodes the data that is transmitted and received. The purpose of the encoding is to make it easier for the receiver to recover the signal. The PMD consists of a transceiver for the physical medium.

Figure 2:
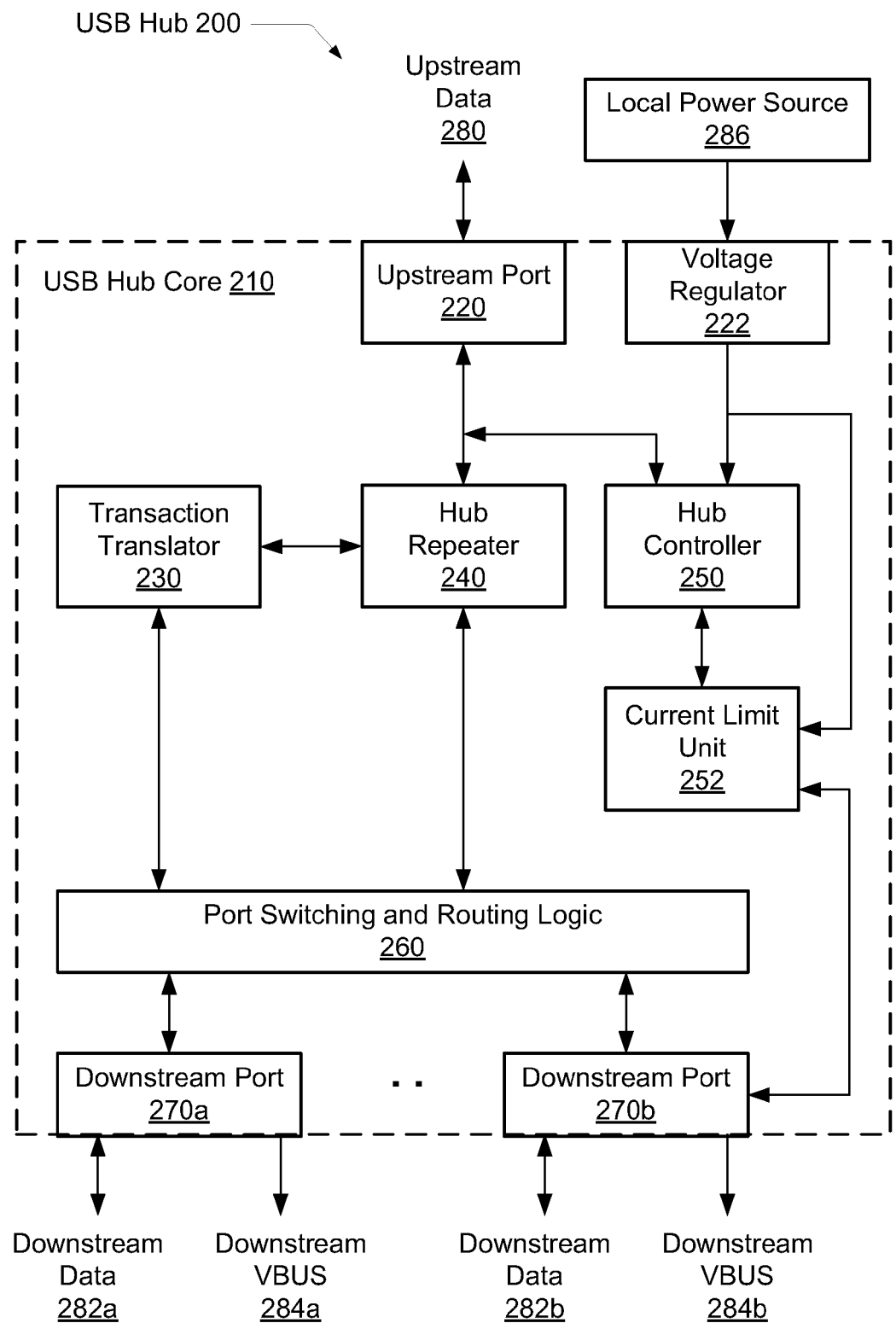
FIG. 2 is a generalized block diagram illustrating one embodiment of a Universal Serial Bus (USB) hub.

Turning now to FIG. 2 one embodiment of an Universal Serial Bus (USB) architecture 200 is shown. A USB hub core 210 may be partitioned into modules, or blocks, as shown. The upstream port 220 may be configured to detect and generate USB reset, suspend, and resume signals on upstream data 280. In addition, logic within upstream port 220 may provide two interfaces, such as an UTMI interface, which can be connected to an external transceiver, and an UTMI+ interface, which can communicate directly with an USB host controller within USB host 130 of FIG. 1.

In one embodiment, USB hub core 210 is a self-powered USB hub core and local power source 286 supplies 5V to USB hub core 210. The local power source 286 is an external independent power supply unit of the USB hub core 210, and the power generated by the local power source 286 may be applied to the USB hub core 210 through an additional power cable rather than a USB cable. In another embodiment, a power supply, such as 5V, may be supplied by the upstream VBUS signal. However, such a configuration is a bus-powered hub and more modern hub cores are self-powered hubs. Voltage regulator 222 may step down the supplied 5V power to a 3.3V power that is supplied to the hub controller 250.

The power supplied by the local power source 286 to the USB hub core 210 is transmitted to the downstream ports 270 through the circuitry of the current limit unit 252, which is controlled by the hub controller 250.

The current limit unit 252 may be necessary to protect functions connected to the downstream ports 270 by supplying a constant current to the downstream ports 270 because the current supplied by the local power source 286 may flow at a few amperes (A).

Hub controller 250 controls the operation of the USB hub by interpreting both USB commands and Hub class specific commands. The hub controller 250 may contain a command interpreter and a transceiver interface. The command interpreter decodes both the USB standard commands as well as the hub class specific commands. The command interpreter may also provide hub and port status information to the host. The transceiver interface may compose and decipher the packet fields.

The hub repeater 240 provides connectivity between the root hub in a host controller, such as within USB host 130 of FIG. 1, and downstream ports. The hub repeater 240 may connect the root hub to the port switching and routing logic 260. For full-speed (FS) and low-speed (LS) transfers, the hub repeater 240 connects the root hub to the transaction translator 230. In one embodiment, USB hub core 210 supports low-speed (LS) transfers, or 1.5 Mbit/s, full-speed (FS) transfers, or 12 Mbit/s, and high-speed (HS) transfers, or 480 Mbit/s.

The transaction translator 230 handles USB 2.0 split transactions by providing support for LS and FS peripheral devices coupled to the downstream ports 270, which may be coupled to a HS bus. The transaction translator 230 supports all types of USB transfers such as bulk, interrupt, control, and isochronous. The transaction translator 230 may consist of a HS interface, data buffers, and a LS/FS interface. Each downstream port 270 is associated with transaction translator 230. USB communication takes the form of packets. Initially, all packets are sent from the host, via the root hub and possibly more hubs, to devices. Some of those packets direct a device to send some packets in reply. The transaction translator 230 may also perform a cyclic redundancy check (CRC) on incoming packets from the hub repeater 240 or the routing logic 260. A CRC may be used as a checksum to detect accidental alteration of data during transmission or storage.

The port switching and routing logic 260 may be used to route LS and HS packets between downstream ports 270 and the upstream port 220, as well as distribute LS and FS packets between downstream ports 270 and the transaction translator 260. The routing logic 260 may connect the hub repeater 240 to the downstream ports 270 in HS transfers.

Downstream ports 270 may contain logic, which is responsible for device connect/disconnect detection, LS/FS/HS speed detection, transaction suspend/resume/termination signaling, and USB reset signaling. Downstream ports 270 may also provide the standard UTMI or ULPI interface to a USB transceiver, which includes the signals downstream data 282, such as the D+ and D− data lines, and downstream VBUS 284 for each downstream port 270.

USB hub core 210 may need to support port power management. Port power management is defined in the USB 2.0 Specification, which is supported by the USB Implementers Forum (USB-IF), to include a power switch and over-current protection with reporting. USB hub core 210 may need to be coupled to an external port power controller. A power switch may be used to switch on or off VBUS power to one or more downstream ports 270 by command from the USB host. The USB host may send a hub specific descriptor to USB hub core 210. The USB hub core 210 in turn may signal a port power controller to either turn on or off VBUS. The switch must turn on voltage at a controlled rate to avoid excessive current draw while charging up capacitance on VBUS. When power is turned off all electric charge must be removed without causing excessive current spikes.

Another function of the port power controller is to provide over-current protection. The over-current limit is set to protect USB cables, connectors, PCB traces and power supplies. The minimum current limit is 500 mA for self-powered hubs and 100 mA for bus-powered hubs. A margin of 150 mA to 250 mA above the minimum limit may be desirable to allow for compatibility with all USB devices. Bus-powered hubs are not required to have over-current protection, but the upstream port may have a much higher over-current limit than 500 mA. For a 7-port USB hub the limit may be as high as 5 amperes. VBUS current limits specified in the USB Battery Charging Specification Revision 1.1 are 1.5 A for a battery charging host or hub port and 1.8 A for dedicated chargers. Therefore, the over-current limit for an external port power controller may need to be programmable depending on the application. When battery charging is supported, the higher current limit may be used, while in standard USB applications, a lower current limit may be used.

In addition, to support legacy battery charging, the VBUS current may be measured in order to detect a USB state for a peripheral device 150, which is further explained shortly. In one embodiment, the resolution for the measurement may be at least 10 mA. The range for the current measurement may be from 0 mA to at least 2000 mA. With an 8-bit analog-to-digital converter (ADC) that has a resolution of 10 mA for one least significant bit the maximum reading would be 2550 mA. Below, Table 1 illustrates one embodiment of critical current levels that may be measured. A simplified ADC may be implemented that only discriminates between the current levels defined in Table 1 instead of a full 8-bit ADC.

TABLE 1

Corresponding Measured Current and USB State Pairs.

| Current (mA) | USB State | Significance |
|---|---|---|
| <2.5 | Suspend current limit | Not detected by the proposed ADC resolution. |
| <=100 | Initial connection before enumeration | Devices are supposed to stay below this limit before enumeration. Battery charging devices are also supposed to adhere to this requirement. |
| <=500 | Bus powered device active power after enumeration | A battery charging device may be connected below this limit and likely if above the limit. |
| >=750 | Over current limit for standard port power control | The low current limit when battery charging is not enabled. |
| <=1500 | Battery charging host or hub port | |
| <=1800 | Battery charging dedicated charger | Current limiting range. |
| >=2000 | Over current limit for battery charger | The upper over-current limit. |

The conversion speed for the ADC may need to be 100 ms or less. The tradeoffs are to limit power consumption for the measurement circuitry inside an external port power controller, to integrate the measurement over a long enough period of time to minimize short term peaks in current consumption by the device, and to be responsive enough for cycling through battery charger signatures.

It may be necessary for a USB hub, such as USB hub core 210, to be utilized for battery charging of a USB peripheral device. However, a difficulty with battery charging of legacy USB peripheral devices is that several schemes have been devised in the market place. There is no prior knowledge of what peripheral device is plugged in to a USB port. The device expects a signature, or code, from the battery charger when it is plugged in. If an invalid signature is present, then the device does not enter a battery charging state.

Figure 3:
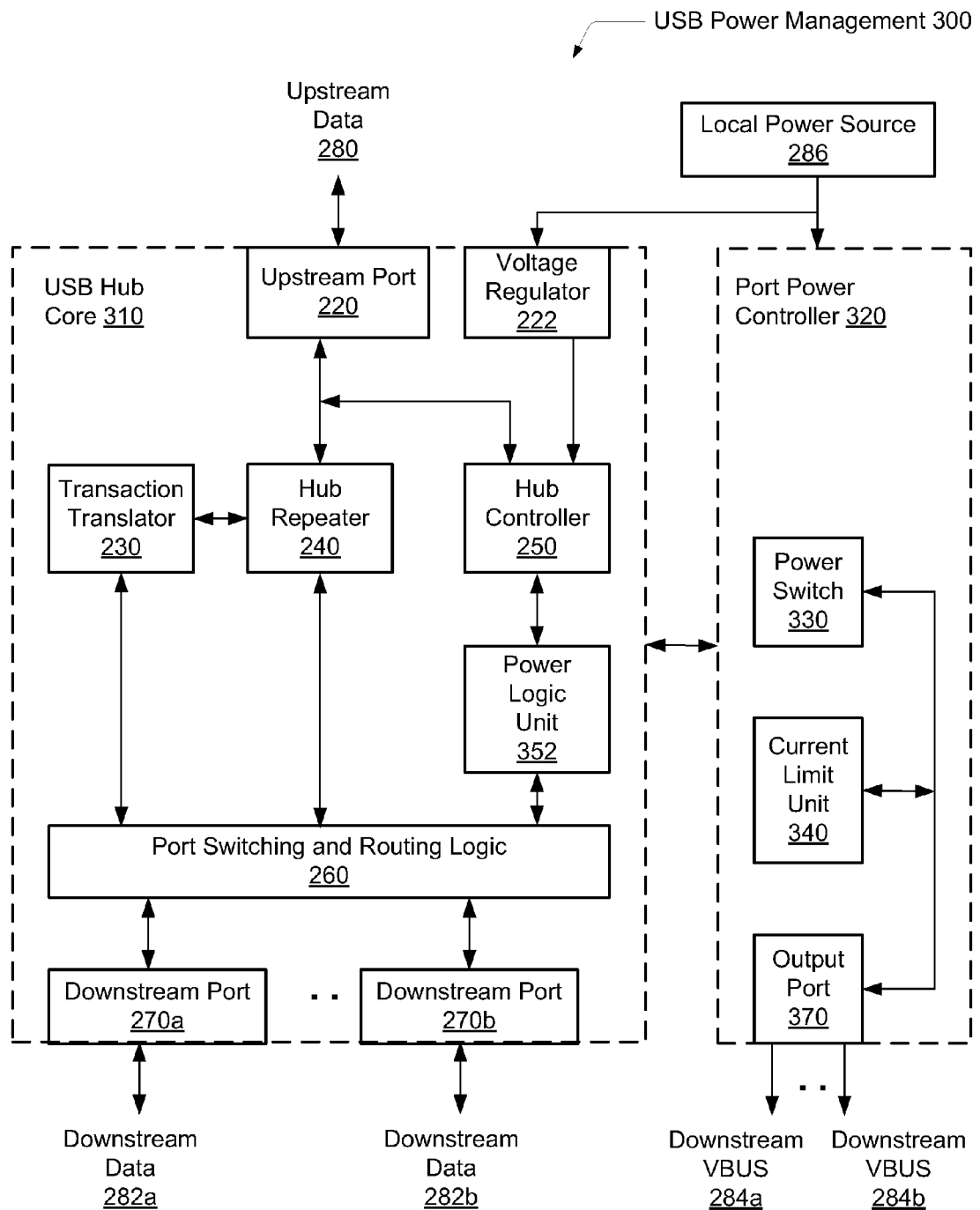
FIG. 3 is a generalized block diagram illustrating one embodiment of a USB power management for support of legacy battery charging.

To support legacy battery charging, enhancements may be required for a USB hub core, such as USB hub core 210. A USB hub may need to recognize several voltage levels on the data lines D+ and D−, to drive non-USB levels on the data lines D+ and D−, and to control an external port power controller in order to cycle through battery charger signatures. Referring to FIG. 3, one embodiment of a USB power management 300 for support of legacy battery charging is shown. Circuit portions that are the same for USB hub 200 of FIG. 2 are numbered accordingly. In one embodiment, the combination of USB hub core 310 and port power controller 320 offer support for both the USB Battery Charging Specification revision 1.1 and legacy battery charging. In such an embodiment, the decision-making logic may reside in USB hub core 310, whereas the port power controller 320 provides an enhanced communication channel and current measurement circuitry. Other partitions are possible and contemplated. For example, the data lines D+ and D− may be routed through the port power controller 320 as a switch. This architecture may be used for automotive markets to provide enhanced over-voltage protection.

USB power management 300 may be used to resolve legacy battery charging issues, without user intervention, by circulating through each of the known battery charger signatures and measure if the connected USB peripheral device entered a battery charging state. Power logic unit 352 may include logic for determining a sequence of steps for performing legacy battery charging. Port power controller 320 may include circuitry for a power switch 330 that may be used to switch on or off downstream VBUS 284 to one or by command from the USB host. The USB host may send a hub specific descriptor to USB hub core 310. The USB hub core 210 in turn may signal the port power controller 320 to either turn on or off VBUS.

The current measurement of a corresponding downstream VBUS line used in a sequence to support legacy battery charging may be performed by current limit unit 340 within port power controller 320. The functionality of current limit unit 252 of FIG. 2 may be incorporated within power limit unit 352 or remain in a separate module. Output port 370 supplies a voltage supply on downstream VBUS lines 284.

In one embodiment, the interface between port power controller 320 and USB hub core 310 includes with enable signals that enables or disables corresponding output VBUS lines, a flag signal that indicates an over-current condition, and lines to carry information such as current limits, a current measurement value, and controller status information. In one embodiment, an Inter-Integrated Circuit ($I^2C$) multi-master serial computer bus is used. Such a bus is typically used to attach low-speed peripherals to a motherboard, embedded system, or cell phone. Alternative embodiments may use a two wire communications protocol based on $I^2C$ such as System Management Bus (SMBus) or Power Management Bus (PMBus).

Figure 4A:
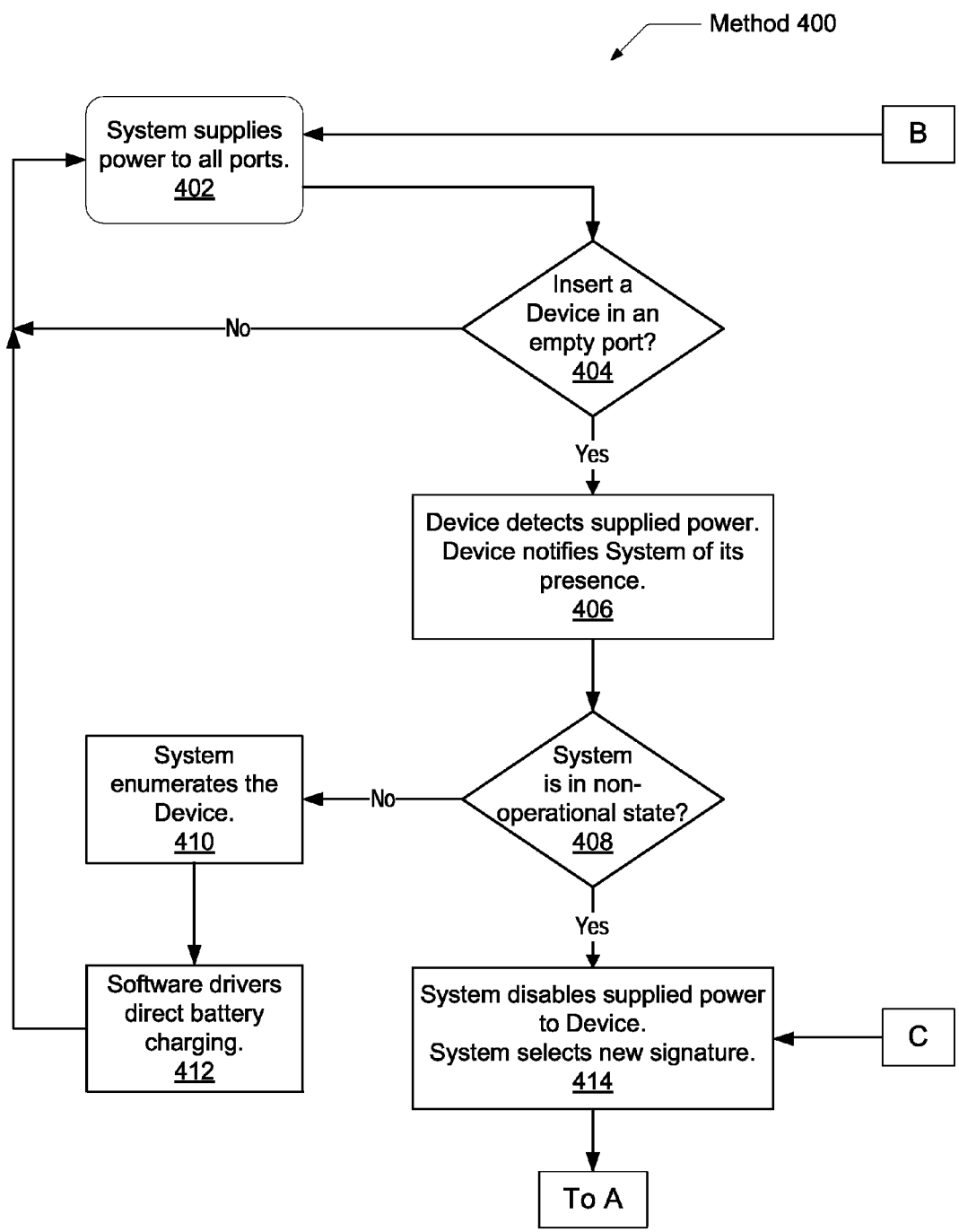
FIG. 4A is a general flow diagram illustrating one embodiment of a method for supporting legacy battery charging of peripheral devices.

The USB power management 300 may utilize a sequence of steps in order to provide legacy battery charging, although the identification of a recently connected USB peripheral device is unknown. FIG. 4A illustrates a method 400 for supporting legacy battery charging of peripheral devices. Method 400 may be modified by those skilled in the art in order to derive alternative embodiments. Also, the steps in this embodiment are shown in sequential order. However, some steps may occur in a different order than shown, some steps may be performed concurrently, some steps may be combined with other steps, and some steps may be absent in another embodiment. In the embodiment shown, an interfacing system, which may comprise a USB host 130 and a USB power management 300 within a larger computing system, supplies power to all ports in block 402. These ports, such as output port 370 that couples the VBUS signal to downstream peripheral devices, may or may not be connected at this point in time.

In block 404, a USB peripheral device is connected to a USB hub that may comprise a USB hub core 310 coupled to a port power controller 320. When a peripheral device is plugged into a USB hub port one of four cases may occur. First, an over-current limit may be reached. This case already follows established standards such as detection by an active current sensor and subsequent shut down of the port. Second, the USB host controller is in an active state, the device is able to be identified by an enumeration process, the peripheral device recognizes negotiation for battery charging by the USB Battery Charging Specification Revision 1.1 protocol. This protocol is contained within the USB hub. A legacy peripheral device will utilize the USB host software to request battery charging.

Third, a small amount of current, such as less than 10 mA, is drained from VBUS without pulling up either data line D+ or D− to a logical high value. This third case falls outside the range of detectable events and no action is taken. Fourth, the connected peripheral device does not identify the USB hub as a battery charger. Each vendor, or manufacturer, has a matching battery charger for each of its peripheral devices. A battery charger from vendor A typically will not work with devices from vendor B. Further, the USB host controller is in a non-operational state, such as a suspend, hibernate, or mechanical off state, and, therefore, the peripheral device may not begin an enumeration process. In this case, the peripheral device is unable to enter a battery charging state. Instead of waiting to enter such a state or never entering such a state, a method may allow the USB hub to select and convey different known legacy signatures to find a signature that matches and is accepted by the plugged-in USB peripheral device. The USB hub may try all of the legacy variants of signatures. If the device is not a legacy device, then the hub may not be able to place the peripheral device in a battery charging state.

For this fourth case, a legacy peripheral device may need to detect that it is plugged-in, or detect a change from an unplugged state to a plugged-in state. This detection triggers the legacy peripheral device to determine whether or not it is connected to a battery charger by checking a conveyed signature value. In order to utilize an automatic method that does not require user intervention, the VBUS line may be turned off, so the peripheral device senses that it entered an unplugged state. When the VBUS line is subsequently turned on, the peripheral device re-enters a plugged-in state and a new signature may be conveyed to the peripheral device for a recognition test. If the VBUS line was not cycled, or turned off and on, the peripheral device would not re-enter a plugged-in state and test a new signature value. This method applies to legacy peripheral devices.

The peripheral device initiates a sequence for supporting legacy battery charging by pulling up at least one of the data lines D+ or D−. If a peripheral device does not follow the USB Battery Charging Specification Revision 1.1 protocol, then it may be required to pull up D+ or D− to a logical high value.

In block 406, the peripheral device detects it has been plugged into a port when the peripheral device detects the supplied power via a VBUS line. However, the system still does not have information regarding the peripheral device. Resistors within the USB hub core as according to a USB Implementers Forum (IF) requirement may weakly pull down the data lines D+ and D−. The low logic value on both data lines may indicate no peripheral device is connected. At this time, the peripheral device may notify the system of its presence by overcoming the weak pull-down and pulling up, or asserting, either data line, D+ or D−. A peripheral device may be required to pull up either D+ or D− within a predetermined period of time after detecting power supplied on a corresponding VBUS line.

Note that only in suspend, hibernate, or mechanical off states may the system be required to cycle through the different battery charger signatures. When the system is operational (conditional block 408), all of the devices will be enumerated in block 410. For example, after boot-up, the USB host periodically polls to learn of any newly attached or removed devices. On learning of a new device, the USB host establishes a communications path between the USB host and the peripheral device. The enumeration starts by sending a reset signal to the peripheral device. The speed of the peripheral device is determined during the reset signaling. After reset, the USB host reads the peripheral device's information and then assigns a unique 7-bit address. In a typical peripheral device, firmware contains the information the USB host will request, and a combination of hardware and firmware may decode and respond to requests for the information. If the USB host supports the peripheral device, then the peripheral device drivers needed for communicating with the device are loaded and the device is set to a configured state in block 412. The software drivers may direct battery charging.

From the user's perspective, enumeration is invisible and automatic except for possibly a message that announces the detection of a new device and whether the attempt to configure it succeeded. Sometimes on first use, the user needs to assist in selecting a driver or specifying where the host should look for driver files.

If the system is in a non-operational state (conditional block 408) and a downstream port senses either data line D+ or D− is pulled high, then in block 414, the system disables the supplied power to the peripheral device for a predetermined amount of time, such as 50 ms-100 ms. The removal of VBUS mimics a disconnect. The system selects a new signature to present to the peripheral device. Control flow of method 400 moves to block A.

Figure 4B:
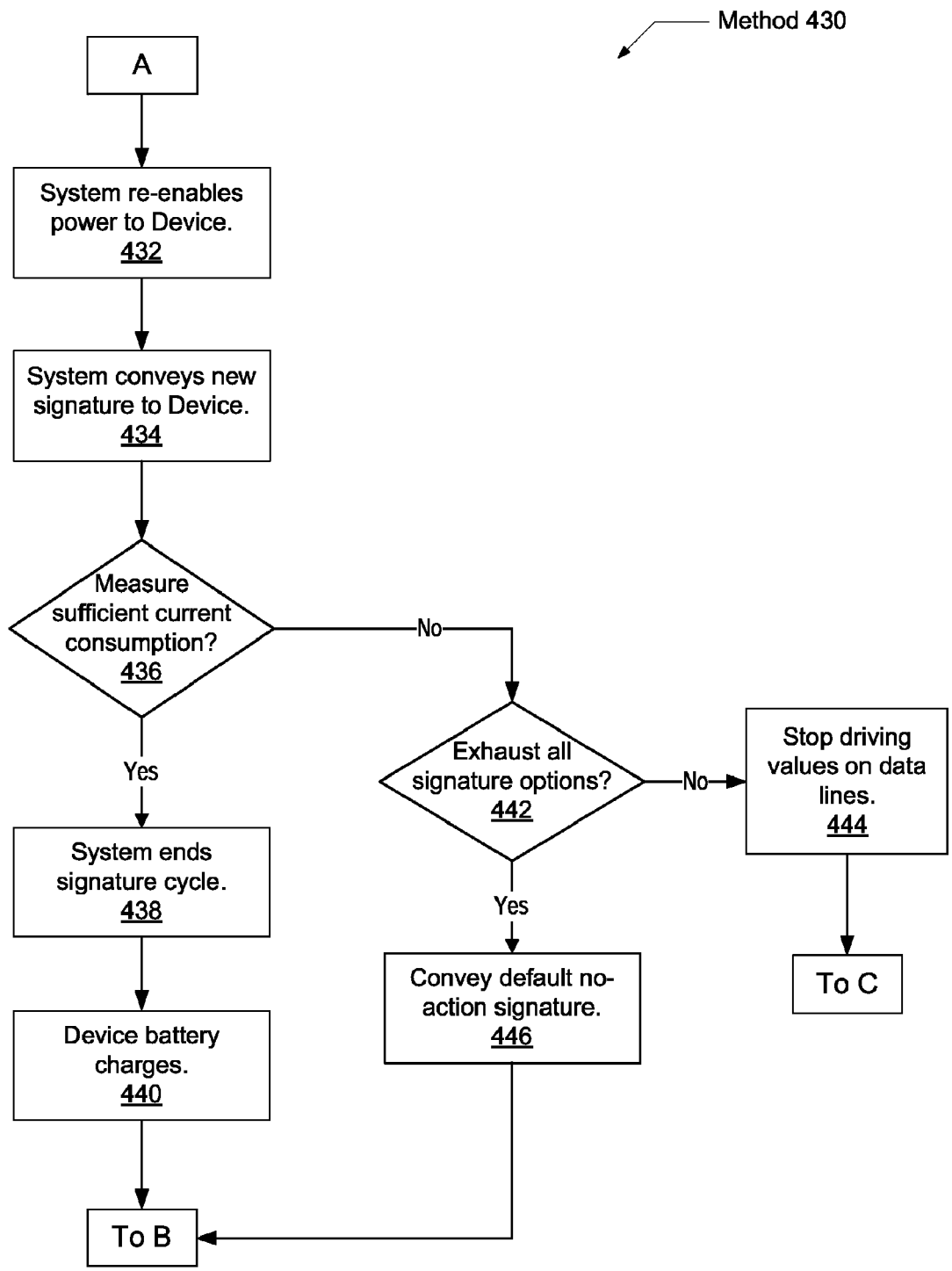
FIG. 4B is a general flow diagram illustrating one embodiment of a method for supporting legacy battery charging of peripheral devices.

FIG. 4B illustrates a method 430 for continuing method 400 in order to support legacy battery charging of peripheral devices. Method 430 may be modified by those skilled in the art in order to derive alternative embodiments. Also, the steps in this embodiment are shown in sequential order. However, some steps may occur in a different order than shown, some steps may be performed concurrently, some steps may be combined with other steps, and some steps may be absent in another embodiment. In the embodiment shown, the system re-enables power to the peripheral device via the power line VBUS in block 432.

Within a few milliseconds, the system presents the new signature on data lines D+ and D− in block 434. One example of a signature is presenting 2.0V on the D+ data line and 2.5V on the D− data line to indicate an Apple iPod or Apple iPhone peripheral device. Another example is presenting 3V on both D+ and D− data lines to indicate a Blackberry peripheral device.

The current drawn from the VBUS line is measured by the port power controller 320. After a predetermined amount of time, such as 500 ms, if the measured current is less than a predetermined value (conditional block 436), such as 100 mA, then the peripheral device did not enter a battery charging state and a new signature needs to be tried. In this case, control flow of method 430 moves to conditional block 442. If all of the available battery charger signatures have not been used (conditional block 442), then in block 444 the USB hub core removes the current signature value from the data lines D+ and D− and these lines are once again weakly pulled down by resistors coupled to a ground reference within the core. Following, control flow of method 430 moves to block C and returns to block 414 of method 400.

If all of the available signatures have been used (conditional block 442), then in block 446 the default no action signature is presented on the data lines D+ and D−, such as allowing these data lines to be weakly pulled down to a logic low value or no action is taken at this time. In such a case, the peripheral device does not enter a battery charging state. The USB hub core 310 may wait for the USB host to transition from a non-operational state to an operational state and subsequently the host may enumerate the peripheral device and may utilize the USB Battery Charging Specification revision 1.1 protocol. Control flow of method 430 then moves to block B and returns to block 402 of method 400.

If the measured current reaches or exceeds a predetermined amount (conditional block 436), such as the typical USB hub value of 100 mA, then the system ends the signature cycle in block 438. The peripheral device has been recognized and the peripheral devices is drawing sufficient current for battery charging in block 440 indicating it has entered a battery charging state. Control flow of method 430 then moves to block B and returns to block 402 of method 400.

Although the embodiments above have been described in considerable detail, numerous variations and modifications will become apparent to those skilled in the art once the above disclosure is fully appreciated. It is intended that the following claims be interpreted to embrace all such variations and modifications

What is claimed is:

1. An interface unit comprising:
   interface circuitry including one or more data lines and at least one power line; and
   power management circuitry configured to control a supply of power to the at least one power line; and
   wherein in response to detecting a device has been connected to the interface circuitry, the interface unit is configured to:
   convey a first signature to the device via the one or more data lines; and
   in response to determining a predetermined response to the first signature is not received from the device:
   remove power from the power line;
   restore power to the power line at a first predetermined time subsequent to removing said power; and
   convey a second signature different from the first signature to the device at a second predetermined time subsequent to restoring said power.

2. The interface unit as recited in claim 1, wherein determining said predetermined response is not received comprises determining current consumption is below a predetermined threshold on the power line at a third predetermined time subsequent to the conveying the first signature to the device.

3. The interface unit as recited in claim 2, wherein detecting a device has been connected to the interface circuitry comprises detecting the assertion of a previously unasserted data line of at least one of said data lines.

4. The interface unit as recited in claim 3, wherein in response to a match of a signature conveyed by the interface unit to a signature of the device, the power management controller is further configured to charge a battery corresponding to the device with current supplied by the power line.

5. The interface unit as recited in claim 4, wherein the interface unit is configured to receive power from a power supply reference, and wherein the power management controller is further configured to drive and detect voltage levels on said plurality of data lines which are different from said power supply reference.

6. The interface unit as recited in claim 4, wherein the device is a non-enumerated Universal Serial Bus (USB) peripheral device.

7. The interface unit as recited in claim 4, wherein the interface circuitry is further configured to couple the device to a computing system in a non-operational state.

8. The interface unit as recited in claim 7, wherein the non-operational state comprises at least one of the following: suspend, hibernate, or mechanical off.

9. An interfacing system method, the method comprising:
   controlling a supply of power to at least one power line; and
   in response to detecting a device has been connected to interface circuitry including one or more data lines and the at least one power line:
   conveying a first signature to the device via the one or more data lines; and
   in response to determining a predetermined response to the first signature is not received from the device:
   removing power from the power line;

restoring power to the power line at a first predetermined time subsequent to removing said power; and conveying a second signature different from the first signature to the device at a second predetermined time subsequent to restoring said power.

10. The method as recited in claim 9, wherein determining said predetermined response is not received comprises determining current consumption is below a predetermined threshold on the power line at a third predetermined time subsequent to the conveying the first signature to the device.

11. The method as recited in claim 10, wherein detecting a device has been connected to the interface circuitry comprises detecting the assertion of a previously unasserted data line of at least one of said data lines.

12. The method as recited in claim 11, further comprising, in response to a match of a conveyed signature to a signature of the device, charging a battery corresponding to the device with current supplied by the power line.

13. The method as recited in claim 12, further comprising driving and detecting voltage levels on said plurality of data lines which are different from a power supply reference supplying power to the at least one power line.

14. The method as recited in claim 12, wherein the device is a non-enumerated Universal Serial Bus (USB) peripheral device.

15. The method as recited in claim 12, further comprising coupling the device to a computing system in a non-operational state.

16. The method as recited in claim 15, wherein the non-operational state comprises at least one of the following: suspend, hibernate, or mechanical off.

17. A power management controller comprising:
an interface coupled to one or more data lines and at least one power line;
a power logic unit configured to control a supply of power to the at least one power line;
wherein in response to detecting a device has been connected to the interface, the power logic unit is configured to:
convey a first signature to the device via the one or more data lines; and
in response to determining a predetermined response to the first signature is not received from the device:
remove power from the power line;
restore power to the power line at a first predetermined time subsequent to removing said power; and
convey a second signature different from the first signature to the device at a second predetermined time subsequent to restoring said power.

18. The power management controller as recited in claim 17, wherein determining said predetermined response is not received comprises determining current consumption is below a predetermined threshold on the power line at a third predetermined time subsequent to the conveying the first signature to the device.

19. The power management controller as recited in claim 18, wherein detecting a device has been connected to the interface circuitry comprises detecting the assertion of a previously unasserted data line of at least one of said data lines.

20. The power management controller as recited in claim 19, wherein in response to a match of a signature conveyed by the interface unit to a signature of the device, the power management controller is further configured to charge a battery corresponding to the device with current supplied by the power line.

* * * * *